INVENTORS
DEAN E. RUNKLE
DONALD J. BAKER
BY
William N. Antonis
ATTORNEY

United States Patent Office 3,463,261
Patented Aug. 26, 1969

3,463,261
FAILSAFE POWER STEERING SYSTEM
Deane E. Runkle and Donald J. Baker, South Bend, Ind., assignors to The Bendix Corporation, a corporation of Delaware
Filed Mar. 28, 1968, Ser. No. 716,789
Int. Cl. B62d 5/10
U.S. Cl. 180—79.2    11 Claims

ABSTRACT OF THE DISCLOSURE

The following relates to a failsafe power steering system for a ground vehicle having a primary pressure source and a secondary pressure source which is rendered functional upon failure of the primary pressure source to provide the necessary power for steering the vehicle. The secondary pressure source actuating mechanism is located in a collapsible steering column formed of two telescoped shafts and includes spaced electric contacts located on the telescoped shafts which are caused to engage upon relative movement between the shafts at steering torque levels above a predetermined value.

Background of the invention

The first power steering systems involved nothing more than a power assist attached to existing steering systems having relatively high overall steering ratios. In such systems the problem of power failure was not particularly objectionable since the vehicle could still be steered without too much difficulty. However, the subsequent and more advanced power-steering systems of today utilize lower constant steering ratios or variable steering ratios in which the overall steering ratio in the straight-ahead vehicle direction is high and progressively decreases as the vehicle front wheels are turned from their straight-ahead direction. In the event of power failure the relatively low steering ratios in these advanced steering systems will result in objectionable manual steering efforts whereby the vehicle can be steered only with great difficulty and possibly not at all.

Summary of the invention

Accordingly, in view of the foregoing, it is an object of this invention to provide a failsafe power steering system wherein a secondary pressure source provides power for steering in the event of failure of the primary pressure source.

Another object of this invention is to provide a failsafe power steering system wherein the second pressure source includes an accumulator which stores fluid under high pressure for emergency use.

A further object of this invention is to provide a failsafe power steering system which can be incorporated into any conventional fluid power steering system without modifying any parts of the steering gear.

A still further object of this invention is to provide a failsafe power steering system of the type described wherein the pressure in the accumulator is released by a solenoid operated valve which is actuated by electrical control means.

An important object of this invention is to combine the electrical control means with a collapsible steering column formed of two telescoping shafts.

More specifically, it is an object of this invention to provide a failsafe power steering system of the type described wherein the electrical control means includes first electric contact means operatively connected to one of the telescoped shafts of the collapsible steering column and spaced second electric contact means operatively connected to the other of the telescoped shafts for engagement with the first electric contact means upon relative movement between the shafts at steering torque levels above a predetermined value.

Another object of this invention is to provide a failsafe power steering system of the type described wherein the accumulator supplies additional power whenever the required steering effort exceeds a predetermined value.

The above and other objects and features of this invention will become apparent from the following description taken in connection with the following accompanying drawings.

Description of the preferred embodiment

Figure 1:
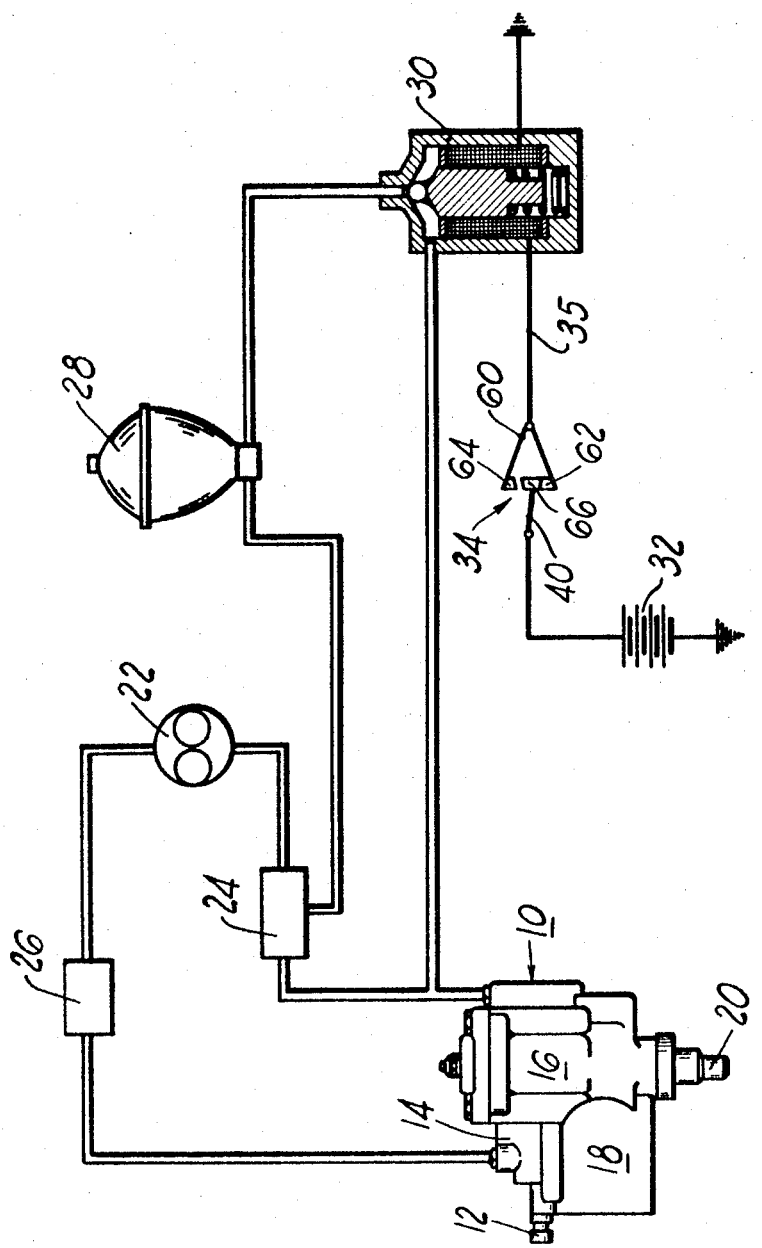
FIGURE 1 is a diagrammatic view of a vehicle hydraulic power steering system which incorporates the invention.
Figure 2:
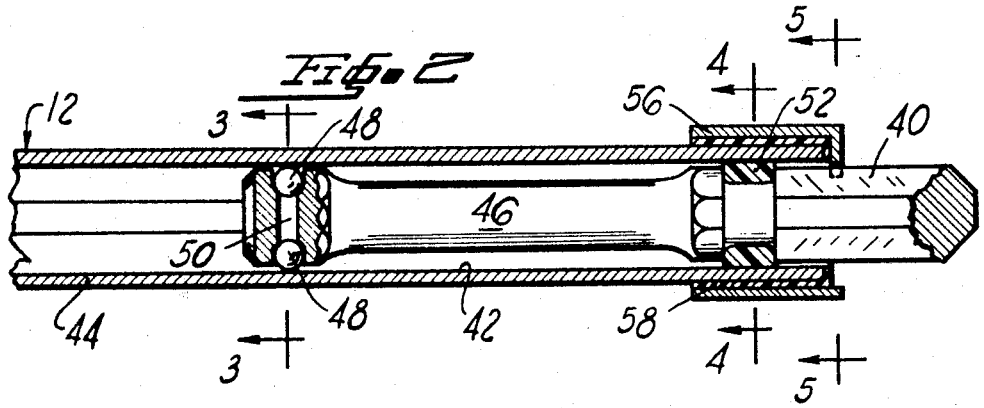
FIGURE 2 is a sectional view of a collapsible vehicle steering column incorporating electrical contact means therein for actuating the auxiliary accumulator power system.
Figure 3:
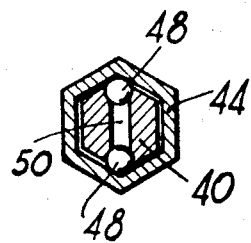
FIGURE 3 is a sectional view taken along line 3—3 of FIGURE 2.
Figure 4:
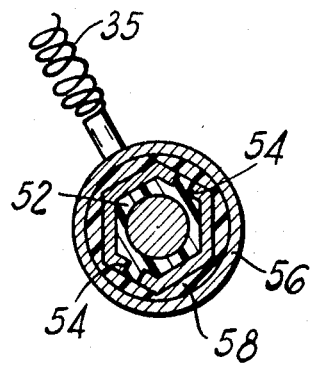
FIGURE 4 is a sectional view taken along line 4—4 of FIGURE 2.
Figure 5:
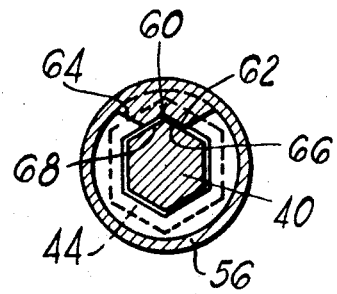
FIGURE 5 is a sectional view taken along line 5—5 of FIGURE 2.

Referring to FIGURE 1 of the drawings it will be seen that numeral 10 designates an integral steering gear unit of the type shown in Brown Patent No. 3,162,263 which includes a steering column 12, a rotary control valve 14, a worm and follower 16, a power cylinder 18, and an output member 20 which is operatively connected to the wheels of a vehicle. The hydraulic circuit includes a pump 22, a regulating valve 24, a reservoir 26, an accumulator 28, a solenoid valve 30, and the requisite pipe lines to and from the control valve 14 of the steering gear unit 10. It will be apparent from FIGURE 1 that although the steering gear unit is hydraulically operated, the secondary pressure source, namely accumulator 28 is electrically controlled. The electrical circuit includes a source of electrical power, such as the car battery 32 and a single pole double throw switch 34 which is located on the steering column 12 and controls energization of the solenoid valve 30 via wire 35.

Referring to FIGURES 2-5, it will be seen that the steering column 12 which is of the collapsible type, includes a shaft 40 having a hexagonal shape which is located in a corresponding hexagonal bore 42 formed in a shaft 44. One of the shafts is suitably connected to the steering wheel (not shown) of the vehicle, whereas the other of the shafts is suitably connected to the control valve 14. It will be apparent from the arrangement of the shafts that in the event of an accident, injury to the driver will be minimized because the steering column can collapse, that is, telescope upon impact. In addition, such a telescoping arrangement of the shafts can easily be adapted to permit axial adjustment of the vehicle steering wheel, if such an adjustment feature is desired.

It will be noted that the inner shaft 40 is formed with a reduced section 46 which acts as a torsion bar. In other words, section 46 is a rotationally flexible section. Located at one end of this reduced section are two balls 48 which are pressed into a drilled passage 50 extending radially from one corner of the inner shaft to the opposite corner thereof. These balls engage the mating corners of the corresponding polygonal bore of the outer shaft and thereby eliminate relative rotation between the shafts 40 and 44 at this one end. Located at the other end of the torsion bar is an insulated bearing 52 for centering the inner shaft with respect to the outer shaft. This bearing can be formed of a plastic which is injected through passages 54 located in the outer tube. If the telescoped shafts of the steering column are not intended to be axially adjustable to position the steering wheel, but are intended only for permitting collapsing of the steering column in the event of an accident, then the bearing can be designed to include shear pins which extend into the passages 54.

A ring 56, formed of suitable conductive material, surrounds the outer shaft and is separated therefrom by an annular insulator 58. The ring 56 has a "V" groove tang 60 on the end thereof which comprises electric contacts 62 and 64 which upon relative rotation between the inner and outer shafts will make contact with the adjacent polygonal faces 66 and 68, respectively, of inner shaft 40. Upon the ocurrence of such contact the solenoid valve 30 will be energized and pressure from the accumulator 28 will be communicated to the control valve 14.

It will be apparent from the structural arrangement of the parts that as long as the steering torque levels are below a predetermined value there will not be sufficient relative movement between the inner and outer shafts to cause closure of the electric circuit control means and consequent communication of the accumulator with the control valve. However, in the event of power failure the torque level will exceed this predetermined value and contact of the inner shaft 40 with the tangs of the ring 56 will complete the electrical circuit, thereby energizing the solenoid valve and causing it to move to an open position which will permit pressurized fluid to flow from the accumulator to the control valve.

From the foregoing, it will be apparent that the invention provides a unique manner for actuating an auxiliary power source in the event of failure of the primary power source wherein the electrical actuating mechanism is incorporated into a collapsible steering column. It will also be seen that these safety features are combined so that it would be possible to fit them into any present day production power gear without modifying any of the steering gear parts.

The several practical advantages which flow from this type of an arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes can be made in the form, structure, and arrangement of parts without departing from the spirit of the invention. Accordingly, we do not desire to be limited to the specific embodiment disclosed herein primarily for purposes of illustration, but instead desire protection falling within the scope of the appended claims.

Having thus described the various features of the invention what we claim as new and desire to secure by Letters Patent is:

1. In a vehicle having steerable wheels, a fluid motor for steering said wheels, a primary fluid pressure source, a secondary fluid pressure source, and a control valve for directing flow to and from said motor, manually operable means for normally communicating said control valve with said primary pressure source and upon failure thereof with said secondary pressure source, said manually operable means including a steering column comprising inner and outer shafts, one of which is axially movable with respect to the other of said shafts, a rotationally flexible section located between the ends of one of said shafts for permitting relative rotation between said shafts, means operatively connected to said inner and outer shafts and located at one end of said rotationally flexible section for eliminating relative rotation therebetween at said one end, and electric circuit control means located at the other end of said rotationally flexible section and operatively connected to said inner and outer shafts for causing communication of said secondary pressure source with said control valve upon actuation thereof, said electric circuit control means being actuated at steering torque levels above a predetermined value which cause flexure of said rotationally flexible section and relative rotation between said shafts at said other end of the flexible section.

2. The structure, as defined in claim 1, wherein said electric circuit control means includes first electric contact means operatively connected to one of said shafts and spaced second electric contact means operatively connected to the other of said shafts for engagement with said first electric contact means.

3. The structure, as defined in claim 2, wherein said rotationally flexible section is located between the ends of said inner shaft.

4. The structure, as defined in claim 3, wherein said rotationally flexible section includes a reduced section acting as a torsion bar.

5. The structure, as defined in claim 4, wherein said first electric contact means is operatively connected to said outer shaft by a non-conductive member.

6. The structure, as defined in claim 5, wherein said first electric contact means extends from a ring which surrounds said outer shaft, and said non-conductive member is an annular insulator located between said ring and said outer shaft.

7. The structure, as defined in claim 11, wherein said second electric contact means are formed on the polygonal faces of said inner shaft.

8. The structure, as defined in claim 7, wherein the means for eliminating relative rotation between said inner and outer shafts at said one end includes abutment means extending from at least one corner of the polygonal inner shaft into the mating corner of the corresponding polygonal bore of the outer shaft.

9. The structure, as defined in claim 8, wherein said abutment means includes a member located in a radially extending bore formed in said inner shaft.

10. The structure, as defined in claim 9, which includes an insulated bearing, located at said other end of the rotationally flexible section for centering said inner shaft with respect to said outer shaft, said bearing including shear pins extending therefrom into openings formed in said outer shaft.

11. The structure, as defined in claim 6, wherein said inner shaft has a polygonal shape and said outer shaft has a corresponding polygonal bore therein for receiving said inner shaft.

References Cited
UNITED STATES PATENTS 2,507,106   5/1950   Knapp _____ 180—79.2
3,280,557   10/1966  Sattavara _____ 180—79.2 X BENJAMIN HERSH, Primary Examiner JOHN A. PEKAR, Assistant Examiner U.S. Cl. X.R.
60—52